United States Patent [19]

Ovies et al.

[11] Patent Number: 4,825,357
[45] Date of Patent: Apr. 25, 1989

[54] I/O CONTROLLER FOR MULTIPLE DISPARATE SERIAL MEMORIES WITH A CACHE

[75] Inventors: Hernando Ovies; Neil A. Katz, both of Boca Raton; Robert H. Farrell, Coral Springs; Ernest D. Baker, Boca Raton, all of Fla.

[73] Assignee: International Business Machine Corporation, Armonk, N.Y.

[21] Appl. No.: 110,080

[22] Filed: Oct. 14, 1987

Related U.S. Application Data

[63] Continuation of Ser. No. 620,981, Jun. 15, 1984, abandoned.

[51] Int. Cl.⁴ .............................................. G06F 13/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,931,615 | 1/1976 | Oliver et al. | 364/900 |
| 3,980,993 | 9/1976 | Bredart et al. | 364/200 |
| 4,084,231 | 4/1978 | Capozzi et al. | 364/200 |
| 4,210,959 | 7/1980 | Wozniak | 364/200 |
| 4,245,307 | 1/1981 | Kapeghian et al. | 364/200 |
| 4,371,929 | 2/1983 | Brann et al. | 364/200 |
| 4,392,200 | 7/1983 | Arulpragasam et al. | 364/200 |
| 4,394,733 | 7/1983 | Swenson | 364/200 |
| 4,476,526 | 10/1984 | Dodd | 364/200 |
| 4,500,958 | 2/1985 | Manton et al. | 364/200 |
| 4,530,055 | 7/1985 | Hamstra et al. | 364/200 |

FOREIGN PATENT DOCUMENTS

| | | |
|---|---|---|
| 0066766 | 12/1982 | European Pat. Off. |
| 2090681 | 7/1982 | United Kingdom |
| 2141566 | 12/1984 | United Kingdom |

Primary Examiner—Gary V. Harkcom
Assistant Examiner—Lawrence E. Anderson
Attorney, Agent, or Firm—Sughrue, Mion, Zinn, Macpeak, and Seas

[57] ABSTRACT

An I/O controller for a computer system having a plurality of memory devices of different types such as floppy and hard disks, whereinn a single cache memory is employed for all of the memory devices. Each of the memory devices is provided with its own interface device which directs data outputted from the associated memory device onto a common device bus. From the device bus data is transferred to a cache memory via a separate cache bus, and then to a system processor via the same cache bus. Memory space within the cache memory may be allocated among the various memory devices.

6 Claims, 1 Drawing Sheet

4,825,357

I/O CONTROLLER FOR MULTIPLE DISPARATE SERIAL MEMORIES WITH A CACHE

This is a continuation of application Ser. No. 620,981, filed June 15, 1984, now abandoned.

BACKGROUND OF THE INVENTION

The invention relates generally to computer storage systems, and, in particular, it relates to a controller for two or more serial memories, such as disks, with perhaps different characteristics and using an I/O cache.

Computer systems typically include a peripheral serial memory for the storage of large amounts of data and perhaps programs. There are various types of serial memory and two of the most popular are a hard disk and a floppy disk, also called a diskette. A hard disk typically stores relatively large amounts of data with a typical storage capacity in the range of 15 to 30 megabytes. Although the access time to a hard disk is relatively long compared to semiconductor memory, its access time is usually much faster than other types of magnetic disks. However, a hard disk suffers the disadvantages of high cost, bulk and difficulty of transporting the hard disk between installations. A floppy disk has different and complementary characteristics. Its capacity is relatively low, with 1.2 megabytes being a typical value, and its access time is typically longer than that for a hard disk. However, both the floppy disk and the diskette drive are relatively inexpensive and compact and the diskettes are easily stored and transported. As a result, it is often advantageous to include both a hard disk and a diskette in the same computer system. Other types of serial memories can be used in computer systems and representative examples are optical disks, cassettes, tapes, bubble memories and charge coupled devices, each with disparate characteristics.

A problem common to almost all serial memories is their slow access times compared to semiconductor random access memories (RAM). The timing problem is composed of two parts. The clocking of the serial memory is typically at a different rate from that of the data bus of the computer and is typically much slower. A more fundamental problem derives from the serial nature of serial storage. Unlike RAM, a finite time is required to get the data in the serial memory arranged for the reading operation. In the case of a disk, data is stored on parallel tracks and a reading head is mechanically moved to the requested track. If the requested track is different from the track over which the reading head is currently positioned, a relatively long seek time is required for the mechanical movement of the head. Once the reading head is correctly positioned, the constantly spinning disk has to rotate to the requested sector of the disk, a so-called rotational latency. On the average, the rotational latency is one half of the disk rotation period. Thus, both a seek time and a rotational latency elapse after the beginning of an access before data begins to be read. The result is that serial memory very often slows the operation of the much faster CPU.

One method of reducing the slow serial memory access times on computer throughput has been described by Dixon et al in U.S. patent application, Ser. No. 270,951, filed June 5, 1981, now U.S. Pat. No. 4,490,782, and by Marazas et al in U.S. patent application Ser. No. 270,750, filed June 5, 1981, now U.S. Pat. No. 4,489,378. Dixon et al and Marazas et al disclose the use of an I/O cache associated with a serial memory. Whenever a record is requested from the serial memory, several neighboring records are also read into the I/O cache. A cache controller keeps track of the contents of the I/O cache. If a subsequent request is made by the CPU for one of these neighboring records, the cache controller determines its presence in the cache memory and immediately supplies the data to the CPU without the need for an access to the much slower magnetic disk. The cache memory operates at semiconductor speeds rather than at the mechanical speed of the disk, whether the disk be a hard disk or diskette. The utility of a I/O cache derives from the fact that there is a high probability that consecutive requests to a memory will be for data stored in nearby locations.

The I/O cache controller of Dixon et al can be used with multiple disks. This multiple use is desirable because the controller is relatively complex and only one disk is going to be used at any one time. However, Dixon et al disclose no way of using their controller with multiple disks having disparate characteristics. Thus, if a computer system is to include both a hard disk and a diskette, either multiple controllers need to be provided or additional circuitry is required.

The use of a single controller for multiple peripheral devices is disclosed by Kaufman et al in U.S. Pat. No. 4,245,300 and by Cukier et al in a technical article entitled "Bus Speed Adapter" appearing in the IBM Technical Disclosure Bulletin, Vol. 25, No. 35, Aug. 1982, at pp. 1504–1507. A single I/O controller for disparate random access memories is disclosed by Dalmosso in U.S. Pat. No. 4,103,328 and by Struger et al in U.S. Pat. No. 4,293,924.

SUMMARY OF THE INVENTION

Accordingly, this invention seeks to provide a controller for an I/O cache in which the controller can support multiple serial memories having disparate characteristics.

The invention can be summarized as a controller for an I/O cache in which controller the serial data from one of multiple serial memory devices is deserialized and transferred on a parallel device bus to a medium sized buffer RAM (random access memory). A large RAM is used as a cache memory associated with the I/O controller which transfers data to and from the processor via a parallel cache bus. Data flow between the buffer RAM and the cache RAM is directed over the device bus and the cache bus, with a buffer register acting as the interface between the two buses. The device bus and the cache bus can be operated independently.

DETAILED DESCRIPTION OF THE PREFERRED EMBODIMENTS

Figure 1:
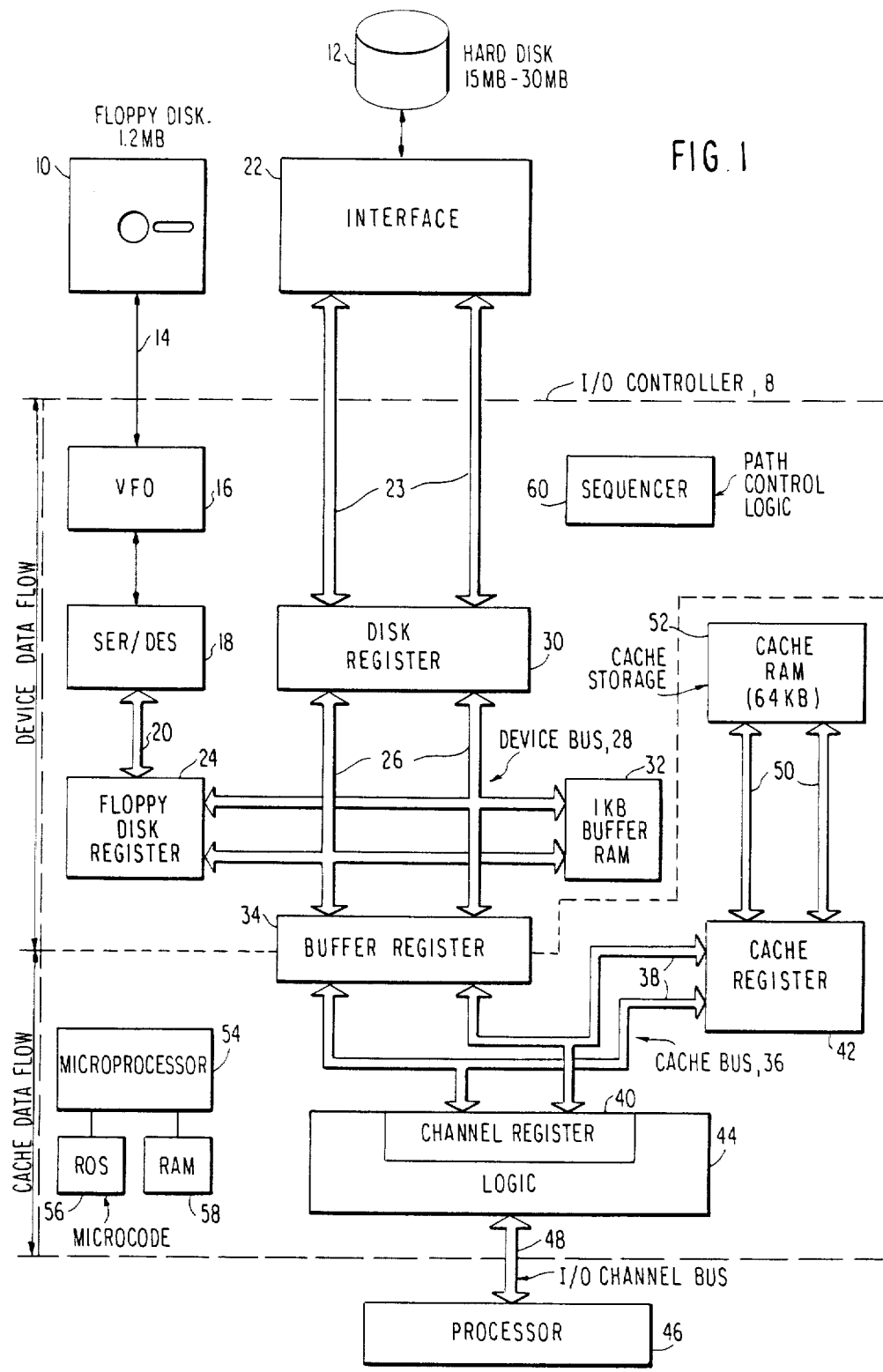
FIG. 1 is a block diagram of an embodiment of this invention.

The invention is a controller for supporting two or more serial memories with an I/O cache, in which the serial memories may have disparate characteristics. A block diagram of one embodiment of a controller 8 the invention is illustrated by the block diagram of FIG. 1. The two serial memories represented are a floppy disk 10 and a hard disk 12. Not only does the disk 10 have a different capacity from the hard disk 12, 1.2 megabytes versus 15 to 30 megabytes, but also the two disks 10 and 12 provide serial data at significantly different serial data rates.

The data from the floppy disk 10 is led on a single serial data line 14 to a variable frequency oscillator 16 which provides a clocking signal based upon the transmission rate of the data. The synchronized data is then led to a serializer/deserializer 18 which, upon reading data from the floppy disk 10, converts the serial data to a byte-wide format. The data is then led to a byte-wide bus 20. A byte can be 9 bits wide, 8 bits of data and one parity bit. When data is being written to the floppy disk 10, the serializer/deserializer 18 performs the opposite function of converting parallel data into a serialized data stream.

The hard disk 12 is somewhat similarly interfaced to the system. However, the functions of the variable frequency oscillator 16 and the serializer/deserializer 18 are incorporated into a disk interface 22. Although the functions of the interface 22 are somewhat similar to those of the oscillator 16 and the serializer/deserializer 18, the interfacing to the hard disk 12 is considerably more difficult than that to the floppy disk 10 so that the interface 22 is likely to occupy its own card, while the variable frequency oscillator 16 and the serializer/deserializer 18 can be included on the card of the controller 8 of this invention. This difference only points out the disparate characteristics of the floppy disk 10 and the hard disk 12. For convenience and speed, the parallel output of the interface 22 may be 2 bytes wide, here represented by 2 byte-wide buses 23.

The bus 20 from the serializer/deserializer 18 is led to a floppy disk register 24, which is 18×1 bits. Also connected to the floppy disk register 24 are two byte-wide buses 26 comprising a device bus 28. The floppy disk register 24 thus reads twice from the bus 20 for every time it outputs two parallel bytes of data to the device bus 28. A disk register 30, which is 18×1 bits, is also connected to the device bus 28 on one side and to the buses 23 from the interface 22 on the other side, but it has equal width buses on both sides. The floppy disk register 24 and the disk register 30 are not essential parts of this invention and could be dispensed with by a careful design of the serializer/deserializer 18 and the disk interface 22.

It is to be appreciated that although the above explanation applies to read operations from either of the disks 10 and 12, in fact the data flow is bidirectional in order to also provide for writing upon the disks 10 and 12.

The device bus 28 is also connected to a buffer random access memory (RAM) 32. In the described embodiment, the buffer RAM is a semiconductor memory and has a capacity of 1 kilobyte and operates as a first-in, first-out buffer. The 1 kilobyte size corresponds to a complete record of data from either the floppy disk 10 or the hard disk 12. In the typical use of the invention, when data is read from either of the disks 10 or 12, the data is read directly into the buffer RAM 32 two bytes at a time. The data is then forwarded to the rest of the controller 8 and to the processor in a first-in, first-out fashion. The data flow rates into and out of the buffer RAM 32 need not be equal.

Similarly, when data is written into the disks 10 and 12, in the usual use of the invention, it is first written into the buffer RAM 32 and is then transferred, two bytes at a time, into the respective register 24 or 30 to be forwarded thence to the requested disk 10 or 12. The use of a record-size buffer RAM in a disk controller is described by Baker et al in a technical article entitled "Partial Record Read and Write Operations for a Diskette Unit" appearing in the IBM Technical Disclosure Bulletin, Vol. 25, No. 10, March 1983, at pp. 5242–5244. It should be noted that the data transfers into and out of the floppy disk register 24 and the disk register 30 are necessarily controlled by the data rates of the respective disk 10 or 12. However, the transfers of data from the buffer RAM 32 to the rest of the system can proceed at much faster rates characteristic of semiconductor devices.

What has been described to this point constitutes the device data flow, that is, the data flow to and from the disk 10 and 12. The interface to the rest of the controller 8 is a buffer register 34 attached to the device bus 28. The buffer register 34 is of size 18×1 bits. On the other side of the interfacing buffer register 34 is a cache bus 36 comprising two byte-wide buses 38. The cache bus 38 is also attached to a channel register 40 and a cache register 42. Both the channel register 40 and the cache register 42 are also 18×1 bits. The channel register 40 is part of a logic circuit 44, which is used for high speed data bypassing and for handshake controls between the controller and a processor 46. The logic circuit 44 is described in detail by Brown et al. in U.S. Pat. No. 4,246,637, incorporated herein by reference. In that reference the channel register 40 is referred to as the cycle steal data register. The communications between the logic circuit 44 and the processor 46 are carried out on an I/O channel bus 48. For purposes of this invention, the channel register 40 can be considered as the port to the external world, taking two parallel bytes of data at a time.

The data flow between the buffer register 34 and the channel bus 48, including flow to and from the cache memory 52, is the cache data flow. A two byte-wide bus 50 connects the cache register 42 to a cache memory 52. The cache memory 52 has a capacity of 64 kilobytes so that it can contain 64 records of data for the disks 10 and 12. The cache memory 52 is a semiconductor RAM that can be accessed significantly faster than the disk 10 or 12. The cache register 42 is required because the handshake controls for the cache memory 52 differ from the handshake controls for the logic circuit 44. It is thus possible, with a proper design of the handshake controls, to dispense with the cache register 42. A cache system is operated such that, when a record of data is requested by the processor 46 from either of the disks 10 and 12, disk 10 or 12 to the cache memory 52. For instance, if record N is requested, then all the records from N−31 to N+32 are transferred to the cache memory 52. The requested record N is then retransferred to the processor 46 from the cache memory 52. Thereafter, if the processor 46 requests one of the records N−31 to N+32 are transferred to the cache writing, the operation is performed to the cache memory 52 instead of to the disk 10 or 12 containing the original copy of the data. At some point, the contents of the cache memory 52 need to be transferred back to their original positions in the disk 10 or 12 if the contents have been updated by the processor 46.

A microprocessor 54 controls the flow of data to the cache according to microcode stored in read only storage 56. The microprocessor 54 also has its own storage area or RAM 58 for a directory to keep track of the contents of the cache memory 52. When the processor 46 requests a record of data, the microprocessor 54 consults the directory in its RAM 58 to determine if the record is contained in cache memory 52, in which case a read from the disk 10 or 12 is not required. However, if the requested record is not in the cache memory 52, according to the directory in the RAM 58, a read or write must be performed to or from the slower disk 10 or 12.

The microprocessor 54 also controls a sequencer 60 which provides the path control logic for all data flow in the device data flow section of the controller.

The use and data organization of the cache memory 52 can be varied under the control of the microprocessor 54. In the mode described above, the cache memory 52 is filled up in a single read from either of the disks 10 or 12. That is, data is transferred between the disks 10 or 12 and the cache memory 52 in blocks of 64 records. Alternatively, the cache memory can be devoted exclusively to the floppy disk 10 or to the hard disk 12. Another attractive alternative is to assign half the cache memory 52 to the floppy disk 10 and the other half to the hard disk 12 so that data is transferred 32 records at a time. It is also possible to subdivide the cache memory 52 so that it may contain separate and non-contiguous blocks from either the floppy disk 10 or the hard disk 12. This subdivision can be dynamically changed by the microprocessor 54.

The primary mode for the flow of information in this controller is described as follows. In a read operation from the floppy disk 10, data is transferred from the floppy disk register 24 to the buffer RAM 32. From the buffer RAM 32 the data is then transferred through the buffer register 34. A write operation to the floppy disk 10 follows the reverse path from the buffer register 34 through the buffer RAM 32 to the floppy disk register 24. Similarly, a data read from the hard disk 12 causes data to be transferred from the disk register 30 through the buffer RAM 32 to the buffer register 34. Similarly also, a data write to the hard disk 12 causes data to be transferred from the buffer register 34 through the buffer RAM 32 to the disk register 30.

It is possible to bypass the buffer RAM 32 by transferring data directly between the buffer register 24 and either the floppy disk register 24 or the disk register 30. The direct transfer between the buffer register 34 and the disk register 30 is the more difficult of the two direct transfers to implement because of the faster data rates on the hard disk 12. It may be desirable to bypass the buffer RAM 32 when large amounts of data are being transferred to or from the disk 10 or 12 and the cache bus 36 is not being used for any other data transfer. In the primary operation of the cache data flow, data is transferred between the buffer register 34 and the cache register 42 and between the cache register 42 and the channel register 40. As described before, when a record of data is requested from one of the disks 10 and 12, a block of several records is transferred through the buffer register 34 and the cache register 42 to the cache memory 52. The requested record is then immediately transferred from the cache memory 52 to the channel register 40 and thence to the processor 46. The microprocessor 54 keeps in its RAM 58 a directory that keeps track of the records stored in the cache memory 52. If the processor 46 subsequently wishes to read a record from either of the disk 10 or 12, the microprocessor consults its RAM 58 to determine if that requested record is in the cache memory 52. If the record is contained therein, the record is transferred from the cache memory 52 through the cache register 42 to the channel register 40, thus avoiding a physical access to the disk 10 or 12 itself. Similarly, when the processor 46 writes a record to either disk 10 or 12, the microprocessor 54 consults its RAM 58 to determine if the record is already in cache memory 52. If so, the record is overwritten in the cache memory 52. The directory contained in RAM 58 also indicates which records contained in the cache memory 52 have been written or updated by the processor 46. Whenever the cache memory 52 is required for a new block of data, the existing written or updated records are first transferred to the proper disk 10 and 12 before the new block is read into the cache memory 52. It is not necessary to transfer the entire block in the cache memory 52 to the proper disk 10 or 12 if only some records have been updated or if the processor has done a disk write for only one or a few records.

It is possible to deselect the caching capabilities of the I/O controller 8. In this case, data is transferred directly between the buffer register 34 and the channel register 40. One reason for bypassing the cache memory 52 is to perform diagnostics on the parts of the controller other than the cache memory 52 and the cache register 42. Another time to bypass cache is when the data being read from the disk 10 or 12 contains a program to be executed. In this situation, large sequential blocks of program are likely to be transferred, and there is a small probability that they will be requested again or be rewritten.

By use of the buffer register 34 and the device and cache buses 28 and 36, the device data flow and the cache data flow are separated. Data can be transferred between the buffer RAM 32 and one of the disks 10 or 12 at the same time that data is being transferred between the cache memory 52 and the channel bus 48. The idea of using buffers on I/O controllers is disclosed by Henrion in U.S. Pat. No. 4,159,516. With some extra design, it is possible to also use the buffer RAM 32 as another cache storage medium. The buffer RAM 32 would then be used for temporary storage of a record of data. If the processor 46 desires to write any of the bytes contained in the buffer RAM 32, then the byte is updated in the buffer RAM 32 without the need for a disk access. This enhancement requires a directory for the buffer RAM 32 and also requires random access to the buffer RAM 32 in addition to its first-in, first-out access.

Thus there has been described an I/O controller incorporating a cache memory 52 which by means of the buffer RAM 32 and the buffer register 34 allows independent data flows on device bus 28 and the cache bus 38. Thereby, multiple memories 10 and 12 can be supported which have different timing characteristics without impacting the data flow between the cache memory 52 and the processor 46.

We claim:

1. An I/O controller for a computer system having a processor and a plurality of serial memory devices connected thereto, at least some of said memory devices differing in the rate at which data is transferred to and from said devices, comprising:

a device bus;
a plurality of interface means for transferring data from respective ones of said memory devices to said device bus, each of said interface means having a first input/output port connected to an input/output port of its respective one of said memory devices and a parallel second input/output port connected to said device bus, said first input/output port of at least one of said interface means being a single-bit serial port and said first input/output port of another one of said interface means being a multi-bit parallel port, all of said second input/output ports of said interface means being multi-bit parallel ports of the same width;

a first-in, first-out buffer memory having an input/output port connected to said device bus for storing records of data to be stored by or read from any of said memory devices, said buffer memory having a capacity sufficient for storing a complete record of data corresponding to a single complete read or write operation to or from any of said memory devices;

a buffer register having a first input/output port connected to said device bus for transferring data between said buffer register and said device bus;

first control means for controlling flow of data on said device bus between said interface means and said buffer memory and between said buffer memory and said buffer register;

a cache bus connected to a second input/output port of said buffer register;

a cache memory for storing data received via said buffer register and said cache bus from each of said memory devices, said cache memory having an input/output port connected to said cache bus;

a channel register having an input/output port connected to said cache bus and being in data communication with said processor; and second control means for controlling flow of data between said buffer register and said cache memory and between said cache memory and said channel register independently of said flow of data on said device bus between said interface means and between said buffer memory and said buffer register, whereby said buffer register serves as an interface between said device bus and said cache bus, which is separate and independently controlled relative to said device bus, and said channel register operates as an interface between said cache bus and said processor.

2. The I/O controller of claim 1, wherein said at least one interface means comprises a serializer/deserializer for converting said serial data output to parallel form.

3. The I/O controller of claim 1, wherein one of said memory device comprises a floppy disk unit and another of said memory devices comprises a hard disk unit.

4. The I/O controller of claim 1, wherein each of said interface means comprises a register for storing data from its respective memory device having a width equal to a width of said device bus.

5. The I/O controller of claim 1, wherein said device bus and said cache bus have the same width.

6. The I/O controller of claim 1, further comprising means for allocating memory space in said cache memory among said memory devices.

* * * * *